United States Patent Office 3,276,975
Patented Oct. 4, 1966

3,276,975
SILVER OXIDE ELECTRODES
Joseph J. Holechek, Reisterstown, Md., assignor to Catalyst Research Corporation, Baltimore, Md., a corporation of Maryland
No Drawing. Filed Dec. 11, 1964, Ser. No. 417,821
10 Claims. (Cl. 204—38)

This application is related to my application Serial No. 44,558, filed July 22, 1960, now abandoned.

This invention relates to an improved process for the preparation of base structures for silver oxide electrodes, and in particular it concerns the preparation of silver oxide electrodes.

The conventional method of making a positive plate for certain batteries involves applying a silver oxide paste to both sides of a nickel grid. The oxide of the resulting structure is then heat reduced to silver bonded to the grid, and further pressed to densify. Thereafter, the structure is treated to convert the silver to active form, namely, monovalent and divalent silver oxides.

Uniformity of the silver, and thus of the silver oxide, on the surfaces of the grid, across and within the grid is highly desirable. For example, the density of the silver and the porosity of the resulting structure influence the rate of discharge of the cell with which such an electrode is used. Experience has shown that the manual application of a paste to a grid is highly unsatisfactory insofar as applying the material evenly is concerned. Moreover, it is extremely time consuming. Where the paste is moistened further so that more uniform application of the material is possible, it has been found that the increased moisture content may cause cracks to develop in the electrode surfaces upon drying which weaken the structure and impair the action of the battery by permitting contact between the electrolyte and the grid. Moreover, after sintering and reoxidation, such electrodes had poor handling qualities.

It is among the objects of the present invention to provide a new method for making silver electrodes, and bases for silver electrodes, of the general type described which is rapid and more economical than the pasting method of production; by which uniform distribution of the silver oxide across and on the sides of the electrode grid is obtained; and which results in a product free from surface cracks and which generally improved physical strength and electrical performance.

In accordance with this invention its objects are obtained by applying, at normal atmospheric temperature, a slurry of silver oxide uniformly over a permeable support while applying vacuum to the support to withdraw moisture from the slurry. A conductive grid is placed on the resulting deposit of silver oxide and an additional quantity of silver oxide slurry is deposited on the exposed surface of the grid under the same conditions of application and moisture removal. Thereafter the structure is compacted to decrease the water content, dried, and heated to convert the silver oxide to metallic silver in an unfused condition. In this general manner, I have been able to produce an electrode blank in which the deposition of the oxide is rapidly and economically accomplished and the oxide is distributed uniformly across, through and on both sides of the grid, and which may be handled and stored. The blank may be converted to an active silver oxide electrode by anodic oxidation. The resulting electrode is free from surface defects, has improved life and strength, and performs better electrically than pasted electrodes.

In the practice of the invention the permeable support preferably is provided by a porous paper which will permit withdrawal of water from the slurry while holding back the silver oxide as a mat; filter paper is preferred for this purpose.

Conductive grids for electrodes take a variety of forms and various metals are used, as is known in the electrode art. For the purposes of this invention it is preferred that the grid take the form of a nickel screen, suitably supplied as silver coated nickel wire. The screen may vary according to, for example, the size of the electrode but it may range from 10 to 60 mesh (Tyler) although it is preferred that it be of 30 to 40 mesh size.

The vacuum applied to the first slurry should be such as to form an oxide mat from which the water has been preponderantly withdrawn. Likewise, the vacuum to which the second slurry is subjected is to be such as to withdraw as much water as possible without pulling the oxide into the mat of the first slurry to any appreciable extent.

The structure thus obtained is then subjected to pressure to compact it and decrease the water content to a point where the oxide feels dry to the touch and such that the structure can be handled.

Thereafter it is dried at a temperature below 100° C. Drying should not be too rapid so as to avoid the formation of cracks. For most purposes it suffices to dry four hours at 65° C.

After drying the permeable support is removed and the structure is heated, most suitably in a muffle, at a temperature to convert the oxide to metallic silver. Silver oxide begins to decompose at about 300° C. but the action is more rapid at higher temperatures and presently it is preferred to effect the reduction at about 500° C. The temperature should be below the melting point of silver for if the metallic particles fuse the performance of the electrode will be impaired.

The blanks thus produced may be activated at once or later. This is accomplished in the manner known in the art, i.e., by anodic oxidation in an alkaline electrolyte, preferably an aqueous solution of potassium hydroxide.

The finished electrodes are strong and adapted to withstand stresses and shock such as are created in the actuation and operation of missiles.

The invention will be further described in conjunction with a specific example by way of illustration and not by way of limitation.

An 11 cm. Büchner funnel was provided to simulate a sheet mold. The funnel was attached to a filter flask, and a filter paper disk (whatman No. 42, 9 cm.) was placed over the holes in the base of the funnel in the usual manner to prevent loss of material during processing. The diameter of the final pad was calculated to be approximately 10 square inches.

Four grams of silver oxide ($Ag_2O$) were placed in a Waring blender with a small quantity of water, mixed for several minutes, and poured into the funnel, which was under vacuum. After this initial layer had been deposited, a 40 mesh nickel screen disk was placed thereon. Then 10 grams of silver oxide were mixed in the blender with a small quantity of water and poured into the funnel, again under vacuum. Thereupon, the mat was removed and pressed at 200 pounds pressure on a Williams press to decrease the residual moisture content of the pad. It was then pressed on a Denison press at 6 tons (1¼" ram). The pressed structure was dried four hours at 65° C. Thereafter, the filter paper was removed and the structure was placed in a muffle furnace and held at 500° C. for one hour to reduce the oxide to silver. Visual inspection of the resulting unit showed no surface cracks. It was also found to be sufficiently pliable to bend back somewhat and forth without cracking or flaking. Aanalysis of the structure showed that the distribution of the silver on each side of the grid was essentially uniform. It was also found that the distribution through the grid was uniform.

From the foregoing example, it is evident that this process is a rapid and economical way of producing these electrodes. It will be noted that the top layer of the electrode was prepared, or deposited, with an amount of the silver oxide that was about 71 percent of the total. It is of primary consequence that the second slurry contain from 2½ to 4 times as much silver oxide as the first slurry.

It will be noted from the foregoing example that the silver oxide slurry was prepared using water as the slurry medium. However, other inert liquids can be used as well, though water normally will be used in view of the economics involved. Similarly, silver peroxide can be used in place of the $Ag_2O$ in practice of the invention.

In addition to the advantages already stated, electrodes produced in accordance with my invention are further advantageous in that the internal electrical resistance will be less than those produced in which an inert binder is necessary.

The process can be adapted for continuous operation. By using a continuous paper machine, a first layer of oxide can be deposited on a continuous filter paper base. Then the resulting deposit is covered with a grid after which a second, or top, layer is deposited. In one run, approximately 4 feet of material were processed. It was found that distribution of the oxide across and through the grid was excellent and that the deposit per sq. inch of the material was in the vicinity of 1.3 grams.

It will be appreciated that this invention can be applied to the formation of electrodes other than those of silver oxide, where thermal reduction is practiced to provide the elemental material so that bonding can be achieved by means of pressure. It will also be appreciated that the grid material can be any material that is compatible with the material to be carried by it, and which has sufficient conductive properties for electrode applications. As indicated above, the screen should range from 10 to 60 mesh of wire that is standard for those mesh sizes. The actual quantity of active material applied to any grid is largely dependent on the grid mesh size, because a larger grid can accommodate more material per unit of surface than could a smaller grid.

The silver-grid-silver structures produced in accordance with this invention can be used in primary or secondary cells and batteries, suitably with zinc negative electrodes.

In accordance with the provisions of the patent statutes, I have explained the principle of my invention and have described what I now consider to represent its best embodiment. However, I desire to have it understood that within the scope of the appended claims, the invention may be practiced otherwise than as specifically described.

I claim:

1. In a method of making a silver oxide electrode the steps comprising applying a first slurry of silver oxide to a porous support while applying vacuum thereto to withdraw liquid therefrom and form a substantially uniform layer of silver oxide on said support, applying an electrically conductive screen to the surface of said layer, applying a second silver oxide slurry to the exposed surface of said screen while applying vacuum to said support to withdraw liquid from the thus deposited silver oxide and form a substantially uniform layer of it on said screen, said first slurry containing from about 0.25 to 1.5 grams of silver oxide per square inch of said screen surface area, and said second slurry containing from 2.5 to 4 times as much silver oxide by weight as in said first slurry, applying pressure to the article to reduce its moisture content and compact said layers, and then heating at a temperature below 100° C.

2. A method according to claim 1, said screen being of 30 to 40 mesh size.

3. A method according to claim 2, said screen being of silver coated nickel.

4. In a method of making a silver oxide electrode the steps comprising applying a first slurry of silver oxide to a porous support while applying vacuum thereto to withdraw liquid therefrom and form a substantially uniform layer of silver oxide on said support, applying an electrically conductive screen to the surface of said layer, applying a second silver oxide slurry to the exposed surface of said screen while applying vacuum to said support to withdraw liquid from the thus deposited silver oxide and form a substantially uniform layer of it on said screen, said first slurry containing from about 0.25 to 1.5 grams of silver oxide per square inch of said screen surface area, and said second slurry containing from 2.5 to 4 times as much silver oxide by weight as in said first slurry, applying pressure to the dried article to reduce its water content and compact said layers, drying the resultant structure at a temperature below 100° C., removing said porous support, and then heating in a muffle to a temperature below the melting point of silver to convert the silver oxide to metallic silver.

5. That method of making a silver oxide electrode comprising the steps of applying a first slurry of silver oxide to a porous support while applying vacuum thereto to withdraw liquid therefrom and form a substantially uniform layer of silver oxide on said support applying an electrically conductive screen to the surface of said layer, applying a second silver oxide slurry to the exposed surface of said screen while applying vacuum to said support to withdraw liquid from the thus deposited silver oxide and form a substantially uniform layer of it on said screen, said first slurry containing from about 0.25 to 1.5 grams of silver oxide per square inch of said screen surface area, and said second slurry containing from 2.5 to 4 times as much silver oxide by weight as in said first slurry, applying pressure to the dried article to reduce the moisture content and compact said layers, drying the resultant structure at a temperature below 100° C., removing said porous support, then heating in a muffle to a temperature below the melting point of silver to convert the silver oxide to metallic silver, and anodically oxidizing the silver to silver oxide in an alkaline electrolyte.

6. A method according to claim 5, said screen being of 30 to 40 mesh size.

7. A method according to claim 6, said screen being of silver coated nickel.

8. A method according to claim 5, the structure being dried at about 65° C.

9. A method according to claim 5 in which the dried article is heated at about 500° C.

10. A method according to claim 5 in which said electrolyte is an aqueous solution of potassium hydroxide.

No references cited.

WINSTON A. DOUGLAS, *Primary Examiner.*

N. P. BULLOCH, *Assistant Examiner.*